(12) United States Patent
Wang et al.

(10) Patent No.: US 11,484,924 B2
(45) Date of Patent: Nov. 1, 2022

(54) DEVICE AND METHOD FOR FORMING SHAFT PART BY TWO-ROLLER FLEXIBLE SKEW ROLLING

(71) Applicant: UNIVERSITY OF SCIENCE AND TECHNOLOGY BEIJING, Beijing (CN)

(72) Inventors: Baoyu Wang, Beijing (CN); Longfei Lin, Beijing (CN); Jinping Liu, Beijing (CN); Cuiping Yang, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 222 days.

(21) Appl. No.: 16/862,937

(22) Filed: Apr. 30, 2020

(65) Prior Publication Data
US 2020/0346262 A1 Nov. 5, 2020

(30) Foreign Application Priority Data
Apr. 30, 2019 (CN) .......................... 201910362201.9

(51) Int. Cl.
*B21B 1/20* (2006.01)
*B21B 37/78* (2006.01)
(Continued)

(52) U.S. Cl.
CPC .............. *B21B 1/20* (2013.01); *B21B 13/008* (2013.01); *B21B 37/78* (2013.01); *G05B 19/18* (2013.01);
(Continued)

(58) Field of Classification Search
CPC .......... B21H 1/18; B21H 1/22; B21B 13/008; B21B 19/00; B21B 19/02; B21B 19/06; B21B 1/20; B21B 19/12
See application file for complete search history.

(56) References Cited

U.S. PATENT DOCUMENTS 693,053 A * 2/1902 McIntosh et al. ...... B21B 19/02
72/95
2,099,497 A * 11/1937 Offutt .................... B21B 19/04
72/100
(Continued)

FOREIGN PATENT DOCUMENTS

CN 103624498 3/2014
CN 108296292 7/2018
(Continued)

OTHER PUBLICATIONS

Translation JP 3-66403A, Nagase, Mar. 1991.*
(Continued)

*Primary Examiner* — Edward T Tolan
(74) *Attorney, Agent, or Firm* — Novick, Kim & Lee, PLLC; Allen Xue

(57) ABSTRACT

The technical field of metal plastic forming processes and equipment, and provides a device and method for forming shaft part by two-roller flexible skew rolling. The device comprises two skew rollers, a guiding plate, two guiding cylinders and an axial pushing device; the skew rollers can do same-direction rotation motion, radial feeding motion and tilt angle adjustment motion; the guiding plate is arranged between the two skew rollers and is used for limiting the radial movement of a blank; the two guiding cylinders are arranged on the two sides of the two skew rollers to limit swing of the blank; and the axial pushing device is arranged at one end of the blank and is used for applying axial pushing force to the blank, and the blank is rolled into a shaft part in a space defined by the skew rollers and the guiding plate. The method of the invention includes a radial compression forming process, a roller tilting forming process, a skew rolling diameter reduction forming process and a roller leveling forming process. The device and method for forming shaft part by two-roller flexible
(Continued)

skew rolling have the advantages that forming equipment is simple, the tonnage is small, flexible production can be achieved, and core loose defects can be reduced and even avoided.

5 Claims, 7 Drawing Sheets

(51) Int. Cl.
    *G05B 19/18*     (2006.01)
    *B21B 13/00*     (2006.01)

(52) U.S. Cl.
    CPC ...... *B21B 2203/40* (2013.01); *G05B 2219/50* (2013.01)

(56) References Cited

U.S. PATENT DOCUMENTS

| | | | | |
|---|---|---|---|---|
| 2,334,853 | A | * | 11/1943 | Wiley ................... B21B 19/10 72/96 |
| 4,136,543 | A | * | 1/1979 | Tuschy ................. B21B 13/008 72/78 |
| 8,037,732 | B2 | * | 10/2011 | Shimoda .................... B21J 5/10 72/367.1 |

FOREIGN PATENT DOCUMENTS

| | | |
|---|---|---|
| EP | 2422896 | 11/2013 |
| EP | 2422898 | 11/2013 |
| EP | 2842649 | 5/2016 |
| JP | 3-66403 A * 3/1991 | ............. B21B 19/06 |

OTHER PUBLICATIONS

Translation CN103624498A, Xu et al., Mar. 2014.*
Pater et al., "Numerical Analysis of the Skew Rolling Process for Main Shafts", Metalurgija 54, vol. 4, pp. 627-630, 2015, Poland.
Pater et al., "Numerical Analysis of the Skew Rolling Process for Rail Axles", Archives of Metallurgy and Materious, vol. 60, Issue 1, pp. 415-418, 2014, Poland.

* cited by examiner (a)

(b)

DEVICE AND METHOD FOR FORMING SHAFT PART BY TWO-ROLLER FLEXIBLE SKEW ROLLING

FIELD

The invention relates to the technical field of metal plastic forming processes and equipment, and in particular relates to a device and method for forming shaft part by two-roller flexible skew rolling.

BACKGROUND

A shaft part, serving as one of the most fundamental parts for delivering motion and power, has been very widely applied in many industrial fields, e.g. cars, rail transit, ships and engineering machinery. Since plastic forming has such advantages as improving structure property, increasing the utilization ratio of materials and achieving high production efficiency, the shaft part is mostly produced using a plastic forming process. Small- and medium-sized shaft parts on a large scale are increasingly produced using a cross wedge rolling technique. However, various types of shaft parts on a small scale, especially shaft parts with large sizes, are mainly produced with free forging, fast forging, finish forging and other plastic forming methods currently.

Current forming methods have some restrictions. Free forging and fast forging are low in production efficiency. In about 10 minutes, a bar of train is forged through fast forging, indicating low production efficiency, thus the production requirements are difficult to meet. A product produced with free forging and fast forging is low in precision, thereby causing large machining allowance, consumption of more materials and high cost of subsequent processing; and due to artificial manipulation, poor quality and stability of the product are caused, thereby seriously restricting production of high-quality shaft parts. Although finish forging is a good forming process currently, due to a complicated device structure, it is difficult to master device manufacturing and maintaining techniques, devices are expensive and obtained mostly depending on import, resulting in huge investment for production devices, high cost and its precision needing to be improved. Although cross wedge rolling is high in efficiency and dimensions of a product are highly accurate, due to large mold size, high cost and time-consuming and labor-consuming in mold replacement and installation, it is generally suitable for production of shaft parts on a large scale only.

As dimensions of shaft parts become large, specifications diversified and the number small, flexible manufacturing for realizing "one device doing more jobs" and "small device doing significant jobs" through a numerical control system becomes particularly significant.

The current three-roller skew rolling forming method of rail vehicle axles (CN201810034928), Numerical analysis of the skew rolling process for main shafts (DOI: 10.1515/amm-2015-0068) and other forming methods all adopt three-roller skew rolling forming without the capability of flexible rolling; and the device structure is complicated, cost is high and automation degree is low. In the current forming method of hollow-shaft type part (CN201310661153.6), Method for rotary compression of hollow parts by cross rolling (EP2422896B1), Method for plastic forming of toothed shafts (EP2422898B1), A method of rolling extrusion with regulated axis spacing of axi-symmetrical stepped parts (EP2842649B1), due to the fact that a roller has no oblique pivot angle, and mainly adopts cross rolling or extruded cross rolling for forming, thereby causing that axial pushing force is too large and required tonnage of devices is large.

SUMMARY

The objectives of the invention are to overcome defects of the prior art, and provide a device and method for forming shaft part by two-roller flexible skew rolling to realize two-roller flexible skew rolling of shaft parts by controlling motion of a skew rolling device and a blank.

The invention adopts the following technical solutions:

a device for forming shaft part by two-roller flexible skew rolling comprises a first skew roller, a second skew roller, a guiding plate, a first guiding cylinder, a second guiding cylinder and an axial pushing device;

the first skew roller and the second skew roller both can do roller rotation motion rotating around the roller axis, straight-line motion in the radial direction of a blank and tilt angle adjustment motion adjusting included angles between the axes of the skew rollers and the axis of the blank. Radial center lines of the first skew roller and the second skew roller coincide with each other;

the guiding plate is fixedly arranged between the first skew roller and the second skew roller and is used for limiting the radial movement of the blank;

the first guiding cylinder and the second guiding cylinder are respectively and fixedly arranged on the two sides of the two skew rollers and are used for controlling swing of the blank;

the axial pushing device is fixedly arranged on one side of the two skew rollers and is used for applying axial pushing force to the blank;

the blank is subjected to skew rolling in a space defined by the first skew roller, the second skew roller and the guiding plate to form a shaft part.

Further, the motion of the first skew roller and the second skew roller is dynamically adjustable in a forming process and controlled by a numerical control program.

Further, the first skew roller and the second skew roller have the same geometric dimensions and each sequentially comprise a finishing section, a forming section and a guiding section from the outer edge to the inner side.

Further, the forming section has surface features used for increasing the friction force, and the surface features are knurls, roughness and engraved dints or dents.

Further, the guiding plate arranged at the side of the blank is a single-side guiding plate or a double-side guiding plate.

Further, the first guiding cylinder and the second guiding cylinder are both hollow cylinders, and diameters of inner holes of the first guiding cylinder and the second guiding cylinder are 0.5 to 5 mm greater than the maximum outer diameter of the blank.

Further, the axial pushing device that is a hydraulic cylinder or an electric cylinder may apply axial pushing force.

The invention further provides a method for forming shaft part by two-roller flexible skew rolling. Utilizing the above device for forming shaft part by two-roller flexible skew rolling, the forming method comprises a radial compression forming process, a roller tilting forming process, a skew rolling diameter reduction forming process and a roller leveling forming process.

Further, the first skew roller and the second skew roller both can do roller rotation motion at a rotating speed of $n_0$, straight-line reciprocating motion in the radial direction of a blank at a speed of $v_0$ and tilt angle adjustment motion at an angular speed of $w_0$;

the radial compression forming process: rotating the first skew roller and the second skew roller in horizontal arrangement in the same direction at $n_0$ and pressing down them to each other at the speed of $v_0$; and rotating the blank around the axis of the blank under the action of the friction force of the rollers/blank and forming an oblique step;

the roller tilting forming process: rotating the first skew roller and the second skew roller in the same direction at the rotating speed of $n_0$, and adjusting the first skew roller and the second skew roller in horizontal arrangement into interlaced tilting arrangement at the angular speed of $w_0$;

the skew rolling diameter reduction forming process: rotating the first skew roller and the second skew roller in interlaced tilting arrangement in the same direction at the rotating speed of $n_0$, and rotating the blank around the blank axis and feeding the blank along the blank axis simultaneously under the actions of the friction force of the rollers/the blank and the pushing force of the axial pushing device, and forming a round bar section of the shaft part; and the roller leveling forming process: pushing the blank by the axial pushing device to prevent the axial movement of the blank, rotating the first skew roller and the second skew roller in the same direction at the rotating speed of $n_0$, adjusting the first skew roller and the second skew roller in interlaced tilting arrangement into horizontal arrangement at the angular speed of $w_0$, and forming another oblique step of the shaft part.

Further, the blank is a round bar blank.

Further, the forming method is either one-step forming of the shaft part to the final dimensions or multi-step successive forming of the shaft part to the final dimensions.

Further, the shaft part is a solid shaft or a hallow shaft.

Further, the two-roller flexible skew rolling is cold rolling at room temperature or hot rolling at a temperature of 600 to 1400° C.

The invention has the advantageous effects as follows:

1. By adopting a structure including two skew rollers, the forming device is much simpler;

2. Tilting arrangement of the skew rollers can utilize axial component force of skew rolling to greatly reduce the axial pushing force of the blank;

3. The forming manner belongs to local forming, and the tonnage of the device is small;

4. By controlling motion of the device and the blank, flexible production is realized;

5. Since only the blank in the forming section and the finishing section participates in deformation, core loose defects may be relieved and even avoided;

6. The forming device is simple and reasonable in structure and has a broad application prospect.

Figure 1:
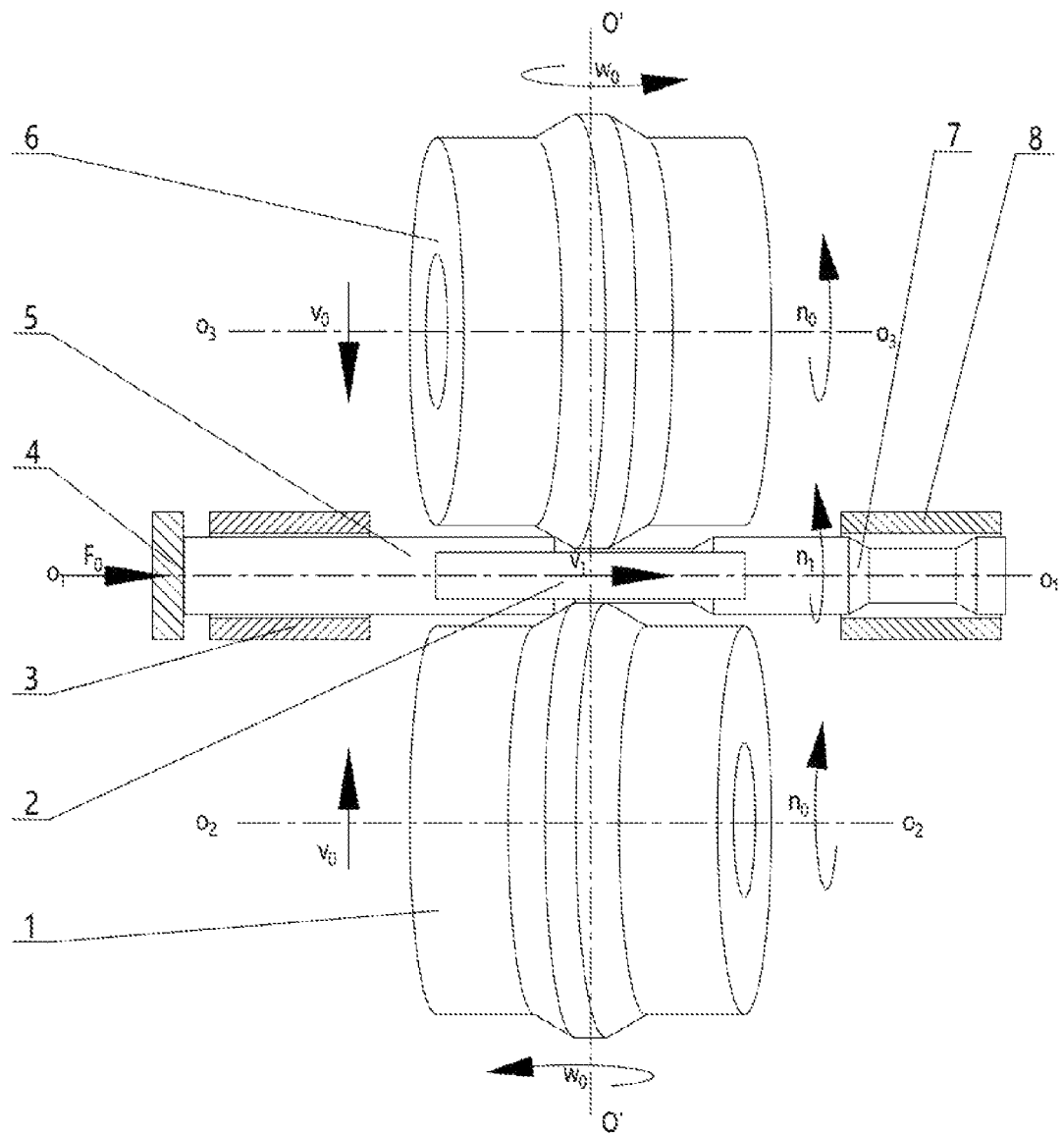
FIG. 1 is a structure diagram of a device for forming shaft part by two-roller flexible skew rolling in an embodiment of the invention.

In the drawings, 1—first skew roller, 2—guiding plate, 3—first guiding cylinder, 4—axial pushing device, 5—blank, 6—second skew roller, 7—shaft part, 7a—solid shaft part, 7b—hollow shaft part, 8—second guiding cylinder, 9—core bar, A-A—finishing section of roller, B-B—forming section of roller, C-C— guiding section of roller, O'-O'—rolling radial center line, $0_1$-$0_1$—axis of blank, $0_2$-$0_2$—axis of first skew roller, $0_3$-$0_3$—axis of second skew roller, α—tilt angle of roller, which is an included angle between the axis of each roller and the axis of the blank, β—nip angle of roller, which is a cone angle of the forming section and the guiding section of the roller and also a cone angle of the oblique step of the shaft part, $n_0$—rotating speed of roller, $v_0$—radial straight-line motion speed of roller, $w_0$—angular speed when rollers adjust the tilt angle α around O'-O', $n_1$—rotating speed of blank, $v_1$—axial speed of blank, F—axial pushing force of axial pushing device, $D_0$—maximum outer diameter of roller, $d_0$—diameter of inner hole of roller, $D_1$—diameter of shaft part, H—maximum reduction of roller, L—total length of roller, and $L_A$—length of finishing section of roller.

DETAILED DESCRIPTION

Specific embodiments of the invention will be described in detail below in conjunction with accompanying figures. It should be noted that the technical features or combinations thereof described in the following embodiments should not be deemed as isolated, as they may be mutually combined so as to achieve a better technical effect.

Figure 6:
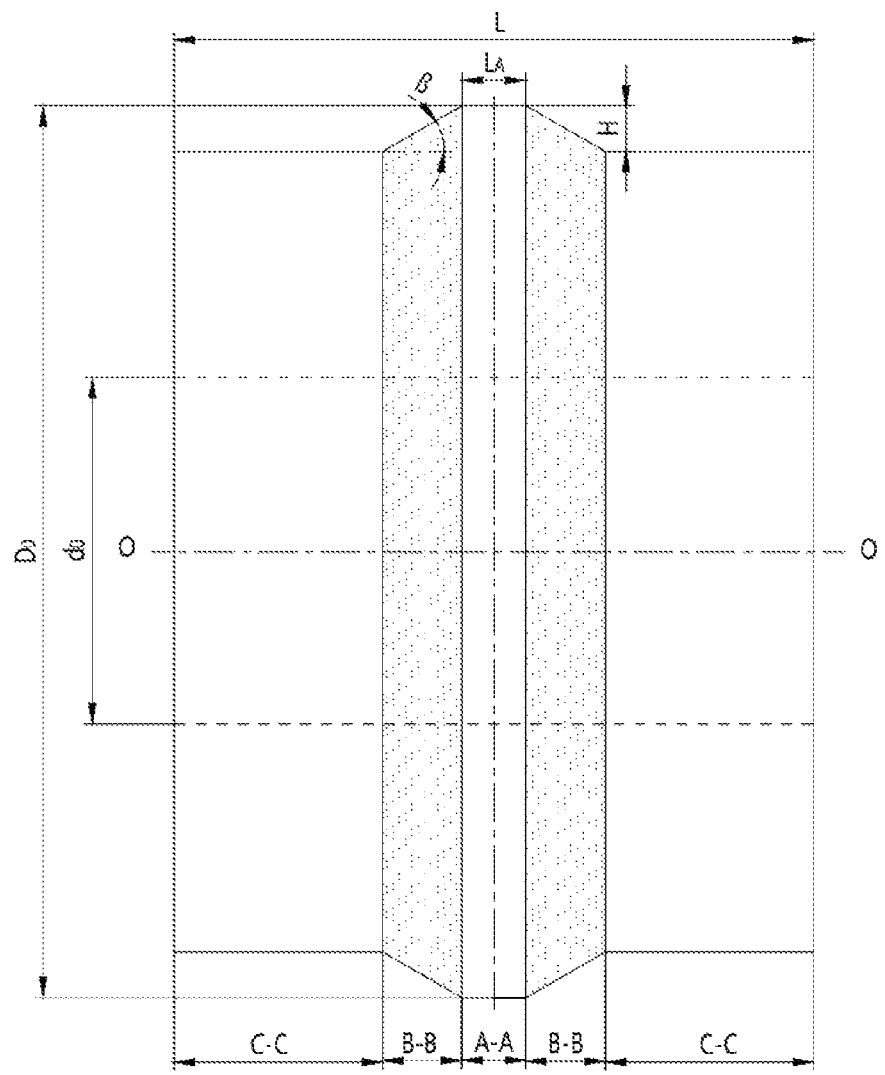
FIG. 6 is a structure diagram of a skew roller.

As shown in FIG. 1, a device for forming shaft part by two-roller flexible skew rolling in an embodiment of the invention comprises a first skew roller 1, a second skew roller 6, a guiding plate 2, a first guiding cylinder 3, a second guiding cylinder 8 and an axial pushing device 4; the first skew roller 1 and the second skew roller 6 both can do dynamically adjustable roller rotation motion rotating around the roller axis and controlled by a numerical control program, straight-line motion in the radial direction of a blank 5 and tilt angle adjustment motion adjusting the included angles between the axes of the skew rollers and the axis of the blank; radial center lines of the first skew roller 1 and the second skew roller 6 coincide with each other; and preferably, as shown in FIG. 6, the first skew roller 1 and the second skew roller 6 have the same geometric dimensions and are geometrically symmetric axially and each comprise a finishing section A-A, a forming section B-B and a guiding section C-C in sequence from the outer edge to the inner side. The forming section B-B has surface features used for increasing the friction force, and the surface features may be knurls, roughness and engraved dints or dents.

The guiding plate 2 is fixedly arranged between the first skew roller 1 and the second skew roller 6 and is used for limiting the radial movement of the blank 5; and the guiding plate 2 arranged at two sides of the blank is a single-side guiding plate or a double-side guiding plate.

The first guiding cylinder 3 and the second guiding cylinder 8 are respectively and fixedly arranged on the two sides of the two skew rollers 1, 6 and are used for controlling swing of the blank 5; the first guiding cylinder 3 and the second guiding cylinder 8 are both hollow cylinders, and diameters of inner holes of the first guiding cylinder 3 and the second guiding cylinder 8 are 0.5 to 5 mm greater than the maximum outer diameter of the blank 5.

The axial pushing device 4 that may be a hydraulic cylinder or an electric cylinder is mounted on one side of the two skew rollers 1, 6 and is used for applying axial pushing force to the blank 5 intermittently.

The blank 5 is subjected to skew rolling in a space defined by the first skew roller 1, the second skew roller 6 and the guiding plate 2 to form a shaft part 7.

A shaft part two-roller flexible skew forming method in an embodiment of the invention is generally applicable and described in the following text with flexible skew rolling of a solid shaft part 7a (see FIG. 7) with a 050 mm round bar blank 5 as an example.

As shown in FIG. 6, the two skew rollers 1, 6 are geometrically symmetric axially and each comprise a finishing section A-A, a forming section B-B and a guiding section C-C. Both the first skew roller 1 and the second skew roller 6 have a length L from 150 mm to 300 mm, a nip angle $\beta$ from 10° to 40°, a hole diameter $d_0$ from 100 mm to 150 mm. The maximum outer diameter $D_0$ is 2.5-6 times that of the round bar blank 5, the length of the finishing section A-A is from 5 mm to 30 mm, and the maximum reduction of roller H is from 1 mm to 15 mm Each forming section B-B is a circular conical surface, and the surface of the forming section B-B has surface features used for increasing the friction force, and the surface features are knurls, roughness and engraved dints or dents.

As shown in FIG. 1, the thickness of the guiding plate 2 is 1-10 mm smaller than the minimum shaft diameter of the shaft part 7. The first guiding cylinder 3 and the second guiding cylinder 8 are arranged on the two sides of the two skew rollers 1, 6 and are used for controlling swing of the blank 5; the first guiding cylinder 3 and the second guiding cylinder 8 are both hollow cylinders, and diameters of inner holes of the first guiding cylinder 3 and the second guiding cylinder 8 are 0.5 to 5 mm greater than the maximum outer diameter of the blank 5. The axial pushing device 4 that may be a hydraulic cylinder or an electric cylinder is mounted on one side of the two skew rollers 1, 6 and is used for applying axial pushing force that is in a range from 0.5t to 10t to the blank 5 intermittently.

As shown in FIG. 1, the two skew rollers 1, 6 both can do rotation motion at a rotating speed of $n_0$, radial straight-line motion at a speed of $v_0$ and tilt angle adjustment motion at an angular speed of $w_0$. Wherein after the motion at $w_0$, the axes $0_2$-$0_2$, $0_3$-$0_3$ of the two skew rollers 1, 6 are both in interlaced arrangement with the axis $0_1$-$0_1$ of the blank 5, forming a tilt angle of $\alpha$. $n_0$ is valued from 20 rmp to 100 rmp, $v_0$ from 1 mm/s to 5 mm/s, $w_0$ from 1.5 rad/s to 3 rad/s, and a from 1° to 15°.

Figure 2:
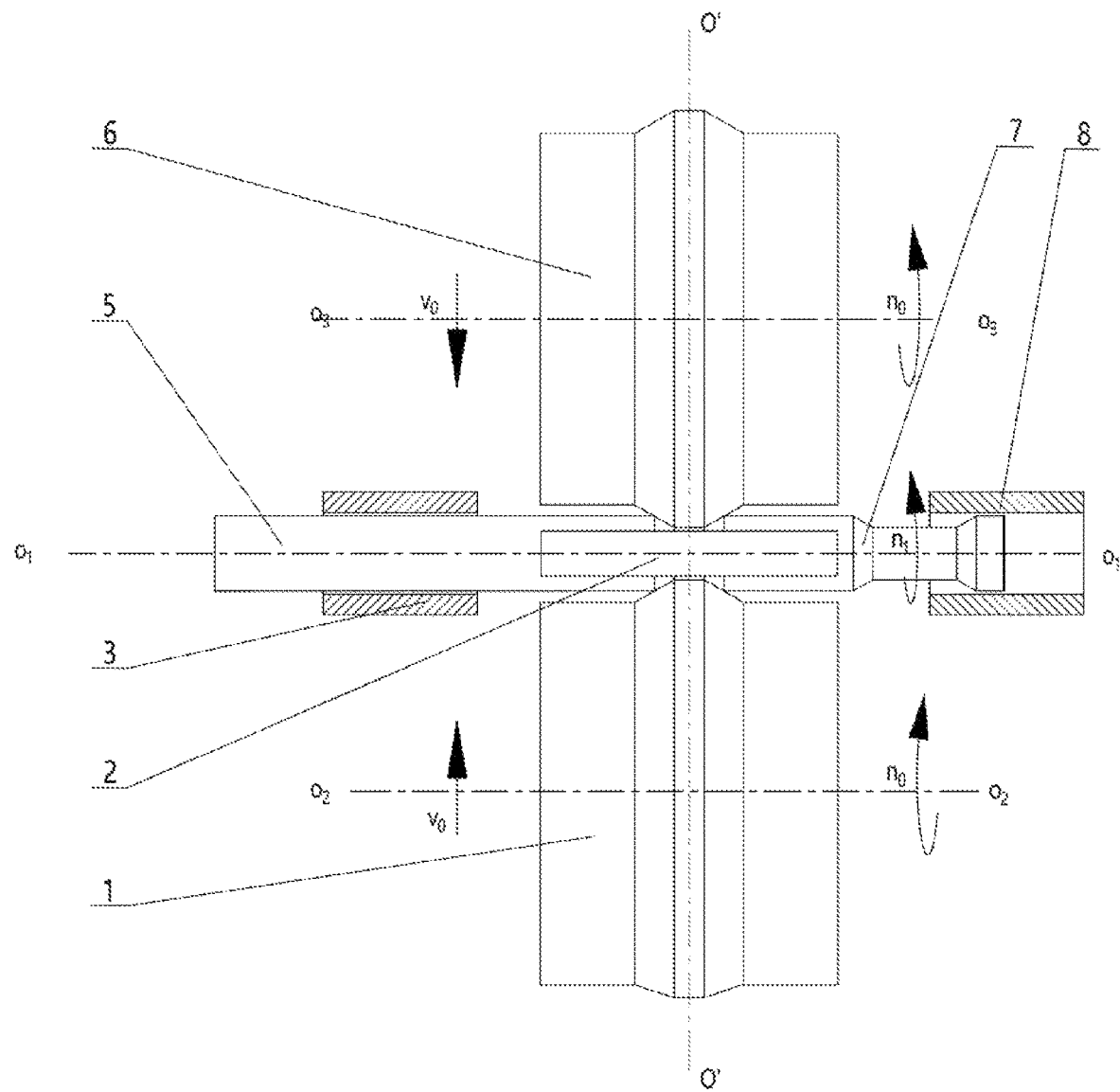
FIG. 2 is a schematic diagram of a radial compression forming process.

As shown in FIGS. 1 and 2, the invention realizes flexible skew rolling forming of the shaft part 7 through a numerical control system, the process parameters mainly controlled include: $v_0$, $n_0$ and $w_0$, and the motion states and forming effects of all the forming processes are as follows.

In a radial compression forming process, as shown in FIGS. 1 and 2, the two skew rollers 1, 6 in horizontal arrangement rotate in the same direction at $n_0$ and are pressed down in opposite directions at $v_0$. Under the action of the friction force of the rollers 1, 6/the blank 5, the blank 5 does rotation motion around the axis $0_1$-$0_1$ and is formed into an oblique step of the shaft part 7.

Figure 3:
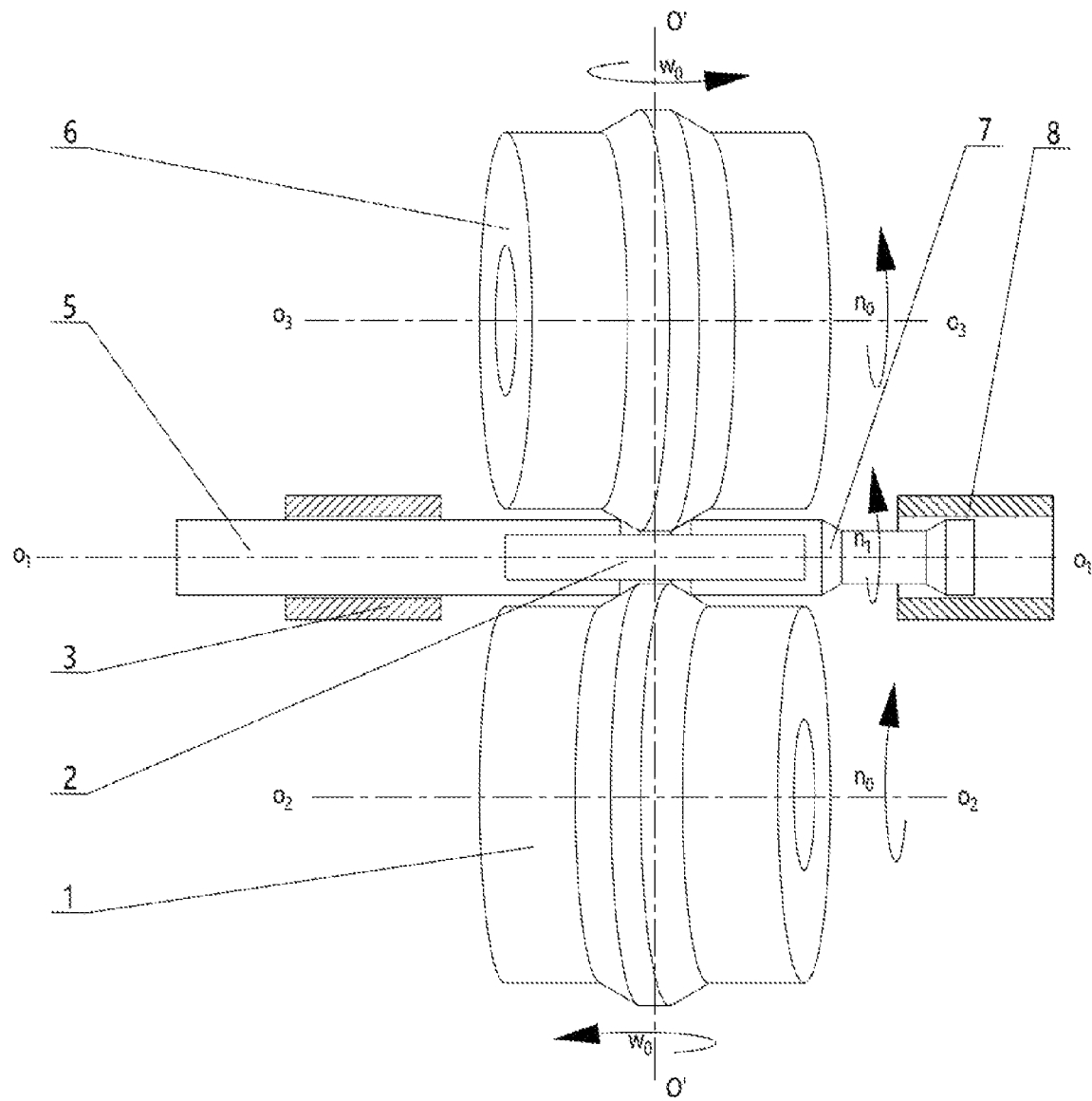
FIG. 3 is a schematic diagram of a roller tilting forming process.

In a roller tilting forming process, as shown in FIGS. 1 and 3, the two rollers 1, 6 do the same-direction rotation at $n_0$ to adjust the two rollers 1, 6 in horizontal arrangement into interlaced tilting arrangement with a tilt angle of $\alpha$ at $w_0$.

Figure 4:
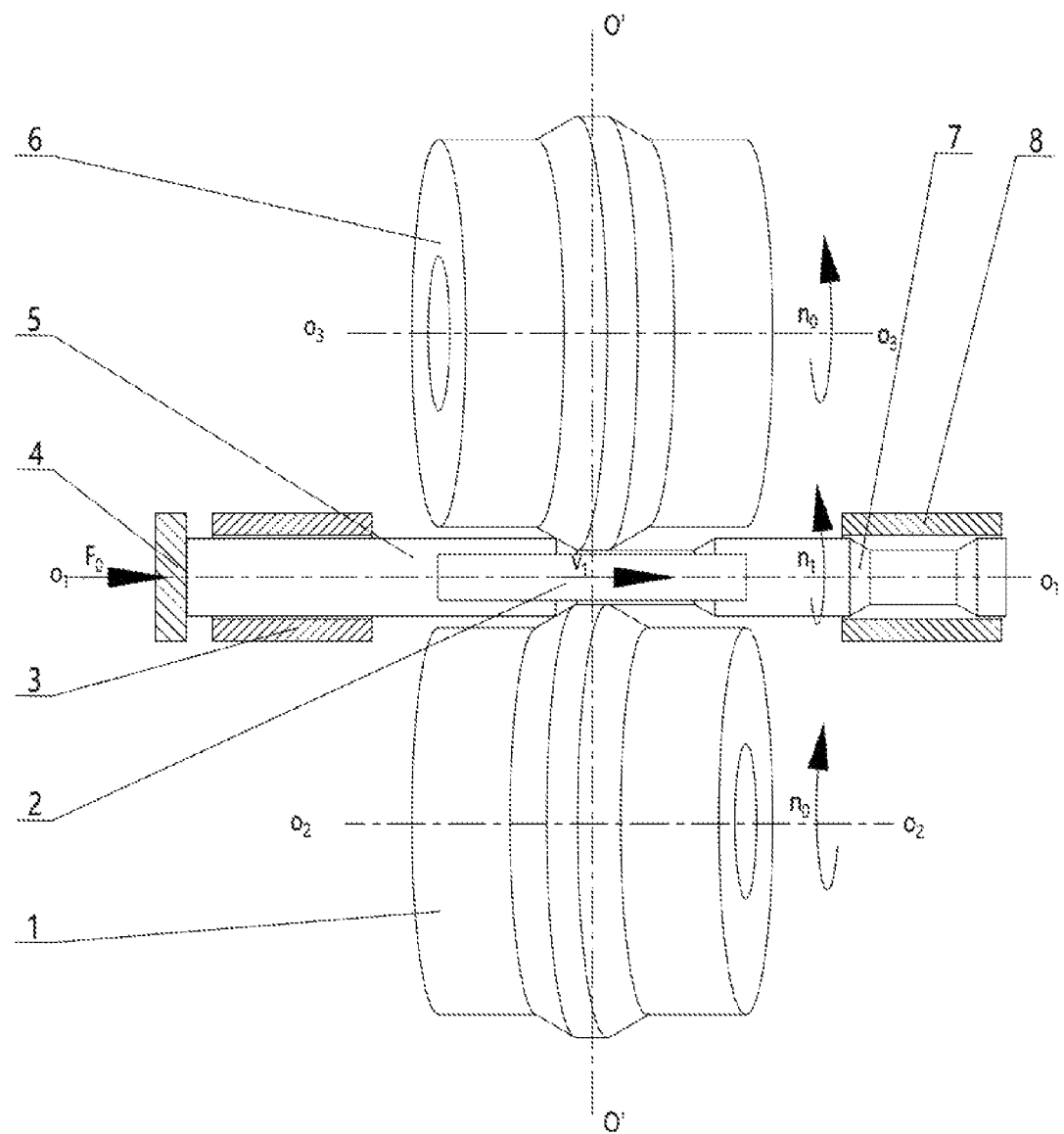
FIG. 4 is a schematic diagram of a skew rolling diameter reduction forming process.

In a skew rolling diameter reduction forming process, as shown in FIGS. 1 and 4, the two skew rollers 1, 6 in interlaced tilting arrangement rotate in the same direction at $n_0$. Under the actions of the friction force of the rollers 1, 6/the blank 5 and the pushing force of the axial pushing device 4, the blank 5 simultaneously does axial rotation motion and axial feeding motion and is formed into a round bar portion of the shaft part 7.

Figure 5:
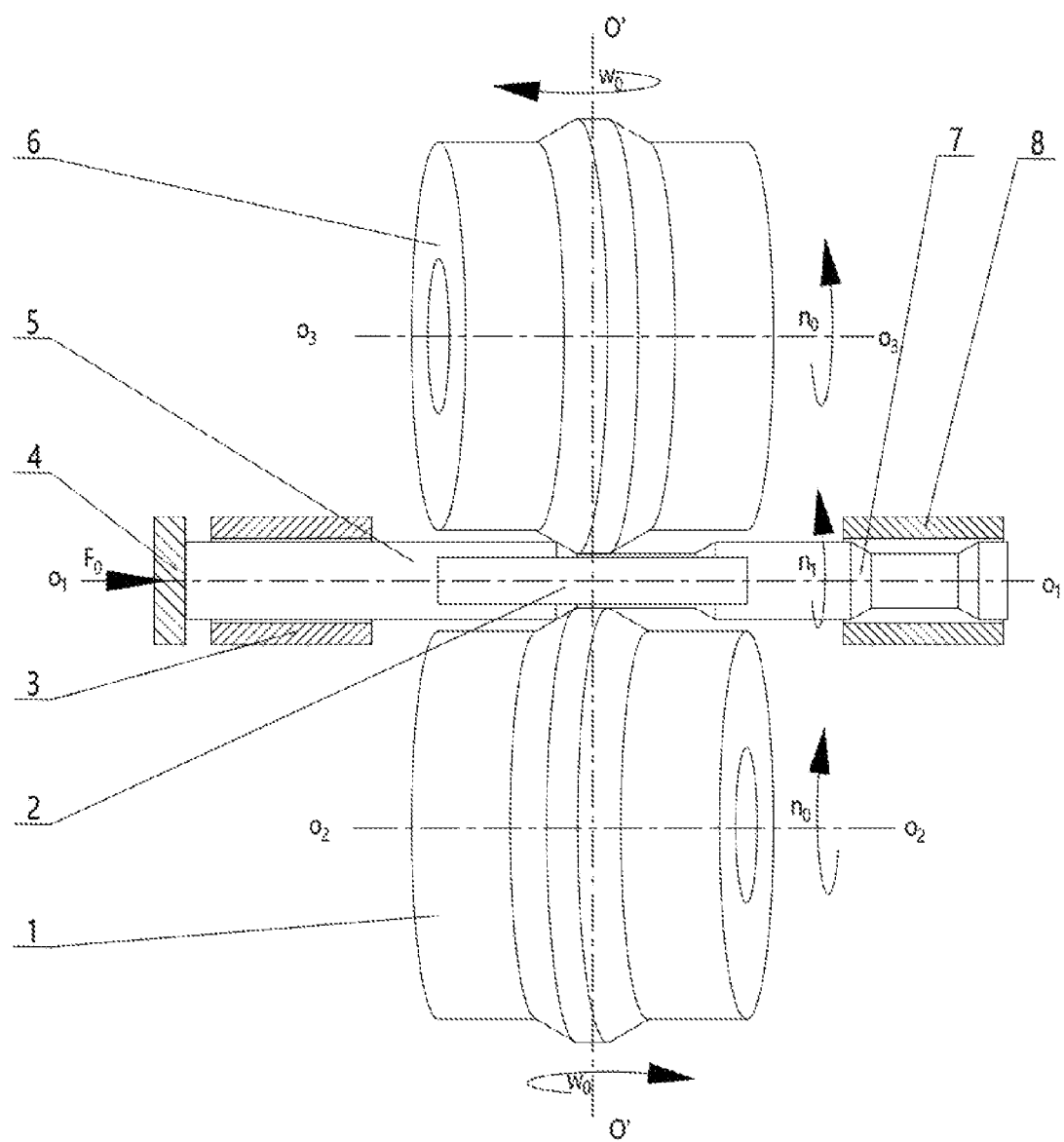
FIG. 5 is a schematic diagram of a roller leveling forming process.

In a roller leveling forming process, as shown in FIGS. 1 and 5, the two rollers 1, 6 do the same-direction rotation at $n_0$ to adjust the two rollers 1, 6 in interlaced tilting arrangement into horizontal arrangement at $w_0$, and meanwhile the blank 5 is formed into another oblique step.

The blank 5 is formed into the shaft part 7 section by section according to forming processes: "radial compression→roller tilting→skew rolling diameter reduction→roller leveling", and finally forming of the entire shaft of the shaft part 7 is completed.

Figure 7:
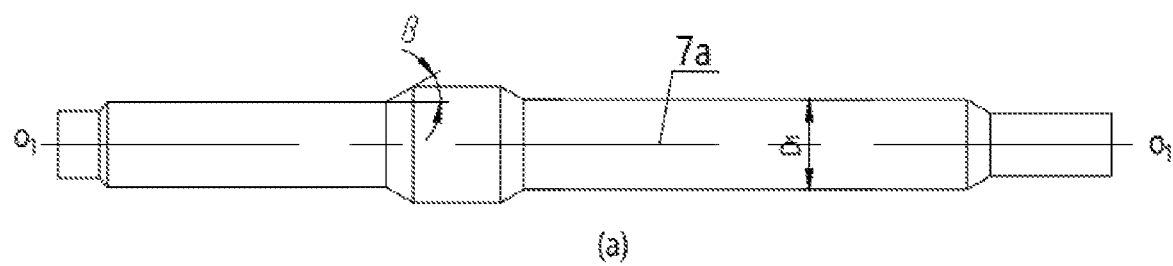
FIG. 7 is a structure diagram of a solid shaft part.
Figure 8:
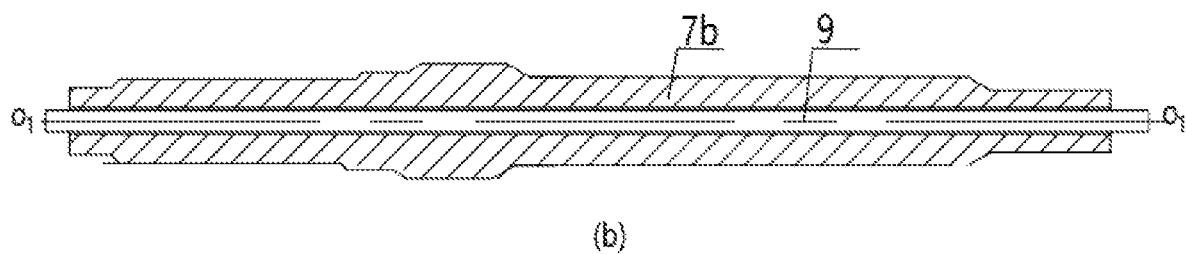
FIG. 8 is a structure diagram of a hollow shaft part.

As shown in FIGS. 7-8, in forming a solid shaft part 7a, the blank 5 does not have a center hole. In forming a hollow shaft part 7b, the blank 5 has a center hole, in which a core bar 9 that has a diameter 0.5-5 mm smaller than hole diameter of the shaft part 7 needs to fill the center hole of the blank 5.

A method for forming shaft part by two-roller flexible skew rolling adopted in an embodiment of the invention mainly includes the following operating steps:

1, determination of the geometric dimensions of the shaft part 7: through the dimensions of a final piece of the shaft part 7, reserving a subsequent machining allowance of 1-3 mm and a stockpile allowance of oblique steps at an angle of $\beta$, and finally determining geometric dimensions of the shaft part 7.

2, design of a numerical control program forming procedure: through geometric dimensions of the blank 5 and the shaft part 7, according to the principle of volume conservation, determining deformation and time of operating procedures and designing a numerical control program forming procedure for flexible skew rolling forming.

3, heating and transfer of the blank 5: heating the blank 5 to a rolling temperature (cold rolling at room temperature and hot rolling at a temperature from 700° C. to 1300° C., and transferring the heated blank 5 into a space defined by the two skew rollers 1, 6 and the guiding plate 2.

4, flexible skew rolling forming of the shaft part 7: through forming processes: "radial compression→roller tilting→skew rolling diameter reduction→roller leveling", performing flexible skew rolling on the blank 5 to form the shaft part 7 section by section.

5, subsequent treatment of the shaft part 7: performing heat treatment, rough turning, finish turning, grinding and other subsequent processes on the shaft part 7 to finally obtain the final piece of the shaft part 7.

The forming principles of the invention are:

transferring the blank 5 heated to rolling temperature into a flexible skew rolling mill formed by the two rollers 1, 6, the guiding plate 2, the guiding cylinders 3, 8, and the axial pushing device 4; through the guiding plate 2 and the guiding cylinders 3, 8, preventing radial movement and swing of the blank 5 and controlling, by the numerical control system, motion of the two skew rollers 1, 6 and the axial pushing device 4, and performing radial compression, roller tilting, skew rolling diameter reduction, roller leveling and other forming processes on the blank 5, so as to perform skew rolling on the blank 5 in a space defined by the first skew roller 1, the second skew roller 6 and the guiding plate 2 to form the shaft part 7.

During the radial compression, the two skew rollers 1, 6 in horizontal arrangement rotate in the same direction and are radially pressed down in the opposite directions. Under the action of the friction force of the rollers 1, 6/the blank 5, the blank 5 does axial rotation motion and is formed into one oblique step of the shaft part.

During the roller tilting process, the two rollers 1, 6 do the same-direction axial rotation to adjust the two rollers 1, 6 in horizontal arrangement into interlaced tilting arrangement.

During the skew rolling diameter reduction process, the two skew rollers 1, 6 in interlaced tilting arrangement do the same-direction axial rotation, the blank 5 simultaneously does axial rotation motion and axial feeding motion under the actions of the friction force of the roller 1/the blank 5 and the pushing force of the axial pushing device 4, and the blank 5 is formed into a round bar portion of the shaft part 7.

During the roller leveling process, the two rollers 1, 6 do the same-direction axial rotation to adjust the two rollers 1, 6 in interlaced tilting arrangement into horizontal arrangement, and another oblique step of the shaft part 7 is formed.

The blank 5 is formed into the shaft part 7 section by section according to forming processes: "radial compression→roller tilting→skew rolling diameter reduction→roller leveling", and finally forming of the entire shaft of the shaft part 7 is completed.

By controlling motion of the skew rollers 1, 6 and the axial pushing device 4 through different forming procedures of the numerical control system, the skew rollers 1, 6 of the same dimensions and specification can be flexibly formed into the shaft part 7 of different dimensions and specifications.

The invention has the advantages that forming equipment is simple, the tonnage is small, flexible production can be achieved, and core loose defects can be reduced and even avoided, such that the forming device can be used for forming train axles, high-speed railway axles, armored car gun-barrels, railway switches, transmission shafts of gear boxes, engine connecting rods, and other shaft parts 7.

Although a plurality of embodiments of the invention have been provided in the text, those skilled in the art should understand that embodiments in the text can be modified without departing from the spirit of the invention. The above embodiments are merely exemplary, such that the range of right in the invention should not be defined based on embodiments of the text.

What is claimed is:

1. A method for forming a shaft from a blank utilizing a device comprising:
    a first skew roller, a second skew roller, a guiding plate, a first guiding cylinder, a second guiding cylinder, and an axial pushing device,
    the first skew roller and the second skew roller being configured to rotate around a first roller axis and a second roller axis, respectively, and to move along a straight line in a radial direction of the blank, and to adjust a first included angle between the first roller axis an axis of the blank and a second included angle between a second roller axis and the axis of the blank;
    a radial center line of the first skew roller perpendicular to the first roller axis and a radial center line of the second skew roller perpendicular to the second roller axis coinciding with each other;
    the guiding plate being fixedly arranged between the first skew roller and the second skew roller to limit a radial movement of the blank;
    the first guiding cylinder and the second guiding cylinder being fixedly arranged apart from the first and the second skew rollers to limit swing of the blank;
    the axial pushing device being fixedly arranged apart from the first and the second skew rollers and configured to apply an axial pushing force to the blank; and
    the blank being subject to skew rolling in a space defined by the first skew roller, the second skew roller and the guiding plate,
    the method comprising: a radial compression forming process, a roller tilting forming process, a skew rolling diameter reduction forming process and a roller leveling forming process,
    wherein the radial compression forming process comprises: arranging the first skew roller, the blank, and the second skew roller horizontally so that the first roller axis, the second roller axis, and the axis of the blank are parallel; rotating the first skew roller and the second skew roller at a same rotational direction and a same rotational speed of $n_0$; moving the first skew roller and the second roller at a same speed of $v_0$ toward the blank from two opposite directions; and rotating the blank around the axis of the blank, thereby forming a first oblique step upon contacting the first skew roller and the second skew roller,
    wherein the roller tilting forming process comprises: rotating the first skew roller and the second skew roller in opposite directions at a same angular speed of $w_0$ so that the first skew roller and the second skew roller are tilted, and the first included angle between the first roller axis and the axis of the blank and the second included angle between the second roller axis with the axis of the blank that are congruent;
    wherein the skew rolling diameter reduction forming process comprises: rotating the tilted first skew roller and the tilted second skew roller that at the same rotational speed of no around their respective axis; and rotating the blank around the blank axis and feeding the blank along the blank axis simultaneously by the pushing force of the axial pushing device, thereby forming a first round bar section of the shaft part in the blank upon contacting the first skew roller and the second skew roller; and
    wherein the roller leveling forming process: pushing the blank by the axial pushing device to prevent the blank from moving in its axial direction; rotating the tilted first skew roller and the tilted second skew roller at the same angular speed of $w_0$ in opposite directions until the first included angle and the second included angle are zero, thereby forming a second oblique step of the shaft part.

2. The method for forming shaft part by two-roller flexible skew rolling according to claim 1, wherein the blank is a round bar blank.

3. The method for forming shaft part by two-roller flexible skew rolling according to claim 1, wherein the forming method is either one-step forming of the shaft part to the final dimensions or multi-step successive forming of the shaft part to the final dimensions.

4. The method for forming shaft part by two-roller flexible skew rolling according to claim 1, wherein the shaft part is a solid shaft or a hollow shaft.

5. The method for forming shaft part by two-roller flexible skew rolling according to claim 1, wherein the two-roller flexible skew rolling is cold rolling at room temperature or hot rolling at a temperature of 600 to 1400° C.

* * * * *